United States Patent [19]
Kim

[11] Patent Number: 5,805,400
[45] Date of Patent: Sep. 8, 1998

[54] AUTO-RECLOSING DEAD TIME CONTROL APPARATUS AND METHOD THEREOF FOR TRANSMISSION CABLE PROTECTION RELAY SYSTEM

[75] Inventor: Il-Dong Kim, Taejeon, Rep. of Korea

[73] Assignee: Korea Electric Power Corp., Seoul, Rep. of Korea

[21] Appl. No.: 752,178

[22] Filed: Nov. 18, 1996

[30] Foreign Application Priority Data

May 18, 1996 [KR] Rep. of Korea ................... 96-16772

[51] Int. Cl.⁶ ............................................. H02H 3/00
[52] U.S. Cl. .................... 361/71; 361/72; 361/93; 361/115
[58] Field of Search ........................... 361/71, 115, 72, 361/73, 93

[56] References Cited

U.S. PATENT DOCUMENTS 3,878,436  4/1975  Bogel ........................... 317/22
5,419,197  5/1995  Ogi ............................... 73/659

*Primary Examiner*—Jeffrey A. Gaffin
*Assistant Examiner*—Stephen Jackson
*Attorney, Agent, or Firm*—Watson Cole Grindle Watson, P.L.L.C.

[57] ABSTRACT

An improved auto-reclosing dead time control apparatus and a method thereof for a transmission cable protection relay system which is capable of providing an on-line stability evaluation method which is capable of controlling the dead time of the transmission cable automatic reclosing relay in accordance with the stability margin, which includes an electrical system for controlling an automatic reclosing operation in accordance with a variation of a transmission cable failure dead time, a transient stability margin evaluation means for evaluating a transient stability margin in accordance with a failure information inputted from the electrical system, and a reclosing relay means for varying the dead time in accordance with a transient stability margin evaluated by the transient stability margin evaluation means.

8 Claims, 9 Drawing Sheets

$$P_{fo}(t_{RC}) = \int_{V_b}^{V_u} G(V) \, F(V) \, dv$$

AUTO-RECLOSING DEAD TIME CONTROL APPARATUS AND METHOD THEREOF FOR TRANSMISSION CABLE PROTECTION RELAY SYSTEM

BACKGROUND OF THE INVENTION

1. Field of the Invention

The present invention relates to an auto-reclosing dead time control apparatus and a method thereof for a transmission cable protection relay system, and in particular to an improved auto-reclosing dead time control apparatus and a method thereof for a transmission cable protection relay system which is implemented based on an on-line transient stability evaluation using a neural network.

2. Description of the Conventional Art

The dead time is related to a time until a flashover does not occur when an air insulation is made due to a de-ion of air after a voltage is not supplied thereto. In more detail, the dead time denotes the minimum time for a successful reclosing.

Generally, the protection relay of the electric power system is used for the purpose so as to maintain system stability and prevent a facility damage by rapidly and accurately removing the causes of the failure.

The above-described failures generally occurs in the electric power transmission system. Among the failures, 80~90% of the total failures occur due to the flashover.

Differently thereform, the transmission cable protection relay system is directed to automatically overcome the transmission network within a shorter time by using the automatic reclosing relay instead of a failure detection relay after a lapse of dead time after the failure.

Therefore, it is possible to enhance the system stability, the electric power supply reliability, and the facility usage ratio, whereby the auto-reclosing method have been used in the industry.

The reasons that the auto-reclosing relay is used in the transmission cable protection method is because most of the failure occurs due to the flashover.

In this case, the transmission cable is disconnected, and the system remains a dead time state for a predetermined time, arc in a place where the failure occurred is removed, and ionized air is insulated again. Therefore, the transmission cable is reconnected, for thus facilitating a normal operation of the transmission cable.

The above-described technique has been generally used in the industry, so that it is possible to obtain a better electric power supply reliability in cooperation with the automatic recover operation when a failure occurs in the system, for enhancing the system transient stability, the facility usage level, and reducing the loss of the electric power.

In addition, the statistical error ratio of the automatic reclosing is about 20~30%, and the higher the transmission voltage, the more the arc removal in a place where the failure occurred is delayed due to an induction voltage from the failure occurrence. Furthermore, the reclosing failure may easily occur due to the surge when a secondary arc is generated, and the electric power is supplied thereto, for thus requiring a longer dead time.

However, in the industry, there were not a method for the dead time determination method of securing success of the reclosing.

In addition, in order to prevent the above-describer problems, a high speed automatic reclosing method which uses a relatively shorter time of one second which is determined in cooperation with an experimental material of the arc removal has been used in the industry.

The above-described high speed automatic reclosing technique has advantages in that it is possible to effectively obtain a system stability and an electric power supply reliability if the high speed automatic reclosing operation is successfully performed; however, when the high speed automatic reclosing operation is not successfully performed, a shaft-twisted impact occurs in the turbine type electric power generator, for shortening the life span of the system.

Namely, electrical and mechanical damages may occur in the electric system such as a power generator, a transformer, etc.

Meanwhile, FIGS. 1A and 1B are views illustrating an auto-reclosing and a transient stability on an electric power supply curve, of which FIG. 1A is a diagram illustrating a second system in the conventional art, and FIG. 1B is a graph illustrating an electric power supply curve variation when a failure occurred in the conventional art.

As shown therein, when an electric power is resupplied at a point "R" on cable A-B, and the supply is successfully performed, it is possible to obtain an effect of varying a phase angle θ to a point "O'" which was originally varied to a point "O" after the electric power failure is recovered to the original state, and the variation from a point "N" to "N'" was improved.

Therefore, in view of the transient stability, the faster the reclosing operation on the cable A-B, the greater the stability margin.

FIG. 2 is a graph illustrating the relationship between an opening/closing surge voltage occurrence distribution and a reclosing dead time in the conventional art. As shown therein, since the electric power resupply failure ratio may be increased in the case that the opening/closing surge is higher than the standard voltage during the electric power resupply after the are removal, a longer dead time is required.

The reclosing success ratio can be expressed as follows.

$$P_{sr}(t_{RC}) = [1 - P_{fo}(t_{RC})] \quad (1)$$

$$= \left[ 1 - \int_{V_b}^{V_a} G(V) \cdot F(V) dV \right]$$

$$P_{ST}(t_{RC}) < P_{ST}(t_{RC} + \alpha_1) < P_{ST}(t_{RC} + \alpha_2), \text{ if } 0 < \alpha_1 < \alpha_2 \quad (2)$$

where, $P_{fo}(t_{RC})$ denotes a failure ratio during a reclosing after $t_{RC}$ seconds;

G(V) denotes an opening/closing surge occurrence statistic distribution;

F(V) denotes a flashover occurrence statistical distribution during a reclosing operation;

V denotes;

$V_a$ denotes a surge voltage of opening/closing maximum value; and $V_b$ denotes a surge voltage of opening/closing minimum value.

The transmission cable reclosing technique which has been used so far in the industry is classified into a low speed method and a high speed/low speed selection method instead of the above-described high speed method.

The high speed/low speed selection method is directed to select a low speed mode in the case that an impact damage of the rotary shaft of the turbine-generator is applied to a bigger cable (such as a generator cable) when a reclosing failure occurs and selects a high speed mode with respect to the cable which is electrically remote from the generator.

Meanwhile, the transient stability of the system is not always in a urgent situation. Namely, the stability margin is different based on the size of the transmission cable, a failure disconnection time, a system structure, and an operational state of the system at the time of the failure.

In addition, since the twist vibration which occurs in the rotary shaft of the turbine-generator is reduced in accordance with a lapse of time, the longer the dead time, the lower the damage.

Generally, in the case of the peak load in the system, the stability is weak. The lower the system load, the higher the stability margin. If the failure cable occurs in a place far from the generator, and the failure occurs in a place where there are many circuits in the system, the effects of the failure is reduced, for thus obtaining an enough stability margin.

For example, the load ratio of the common electric system is about 60~70%. Therefore, since the system is usually operated in the normal load state compared to the maximum load state operation, even though the failure occurs during the normal operation of the electric power system, there is an enough stability margin. Therefore, it is possible to elongate the dead time more compared to the current time, so that the success ratio of the reclosing may be increased. In addition, when the transient stability is enough, the reclosing may not be needed due to the failure.

As described above, since the conventional auto-reclosing dead time control apparatus for a transmission cable protection relay system has the following disadvantages. Namely, since the conventional apparatus is directed to evaluate the system stability by fixing the dead time of the automatic reclosing dead time, the failure ratio of the automatic reclosing is increased. In addition, if the critical failure occurs, and the insulation recover in the place where the failure occurred is not substantially performed, when the failure occurs again due to the high speed reclosing, there may occur electrical, and mechanical impact to the system.

SUMMARY OF THE INVENTION

Accordingly, it is an object of the present invention to provide an auto-reclosing dead time control apparatus and a method thereof for a transmission cable protection relay system which overcomes the problems encountered in the conventional art.

It is another object of the present invention to provide an improved auto-reclosing dead time control apparatus and a method thereof for a transmission cable protection relay system which is capable of providing an on-line stability evaluation method which is capable of controlling the dead time of the transmission cable automatic reclosing relay in accordance with the stability margin.

To achieve the above objects, there is provided an improved auto-reclosing dead time control apparatus for a transmission cable protection relay system which includes an electrical system for controlling an automatic reclosing operation in accordance with a variation of a transmission cable failure dead time, a transient stability margin evaluation unit for evaluating a transient stability margin in accordance with a failure information inputted from the electrical system, and a reclosing relay for varying the dead time in accordance with a transient stability margin evaluated by the transient stability margin evaluation unit.

To achieve the above objects, there is provided an improved auto-reclosing dead time control method for a transmission cable protection relay system which includes the steps of a first step for evaluating an on-line transient stability margin of an electrical system by using a flat amount on-line method based on a parallel processing learning using a neural network by receiving an information inputted when a failure occurred, a second step for varying the dead time in accordance with the transient stability margin evaluated, and a third step for performing an automatic reclosing in accordance with the variable dead time.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1A and 1B are views illustrating an auto-reclosing and a transient stability on an electric power supply curve, of which:

FIG. 1A is a diagram illustrating a second system in the conventional art; and

FIG. 1B is a graph illustrating an electric power supply curve variation when a failure occurred in the conventional art;

DETAILED DESCRIPTION OF THE INVENTION

Figure 3:
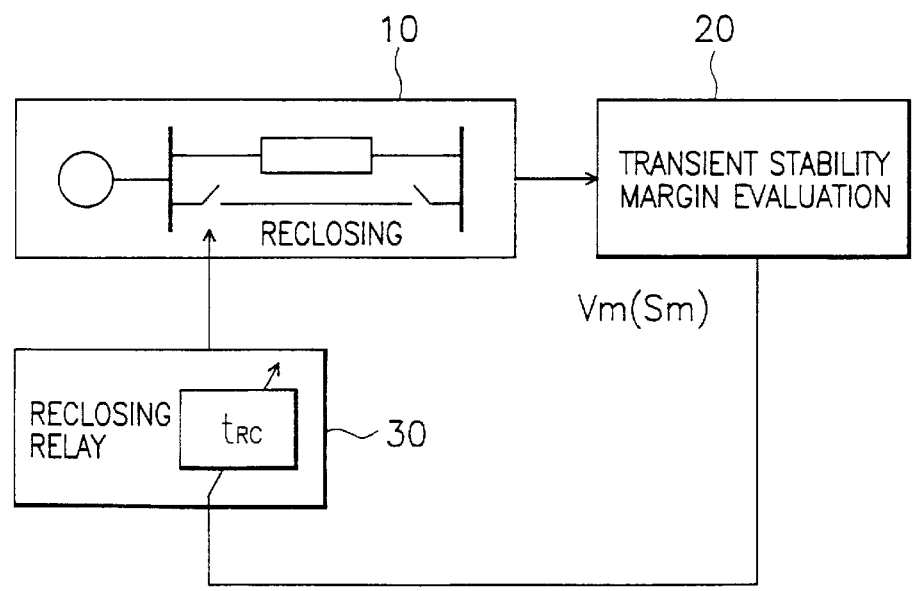
FIG. 3 is a block diagram illustrating a variable dead time reclosing apparatus based on a transient stability margin according to the present invention.

FIG. 3 is a block diagram illustrating a variable dead time reclosing apparatus based on a transient stability margin according to the present invention.

As shown therein, the variable dead time reclosing apparatus based on a transient stability margin includes an electric power system 10 for automatically opening/closing in according with the variation of the dead time when the transmission cable failure occurs, a transient stability margin evaluation unit 20 for evaluating a transient stability margin Sm in accordance with Equation (6) of a transmission electric power P before a corresponding transmission cable failure, a failure duration time (a clearing time: CT), a failure current $I_1$, a failure both-ends voltage $E_B$, a nearby cable operation state Lij, and a reclosing relay 30 for varying the dead time in accordance with the transient stability margin which was evaluated by the transient stability margin evaluation unit 20.

The transient stability evaluation unit 20 is directed to using a plurality of neural networks which will be described later.

The automatic reclosing method according to the present invention will now be explained.

Figure 6:
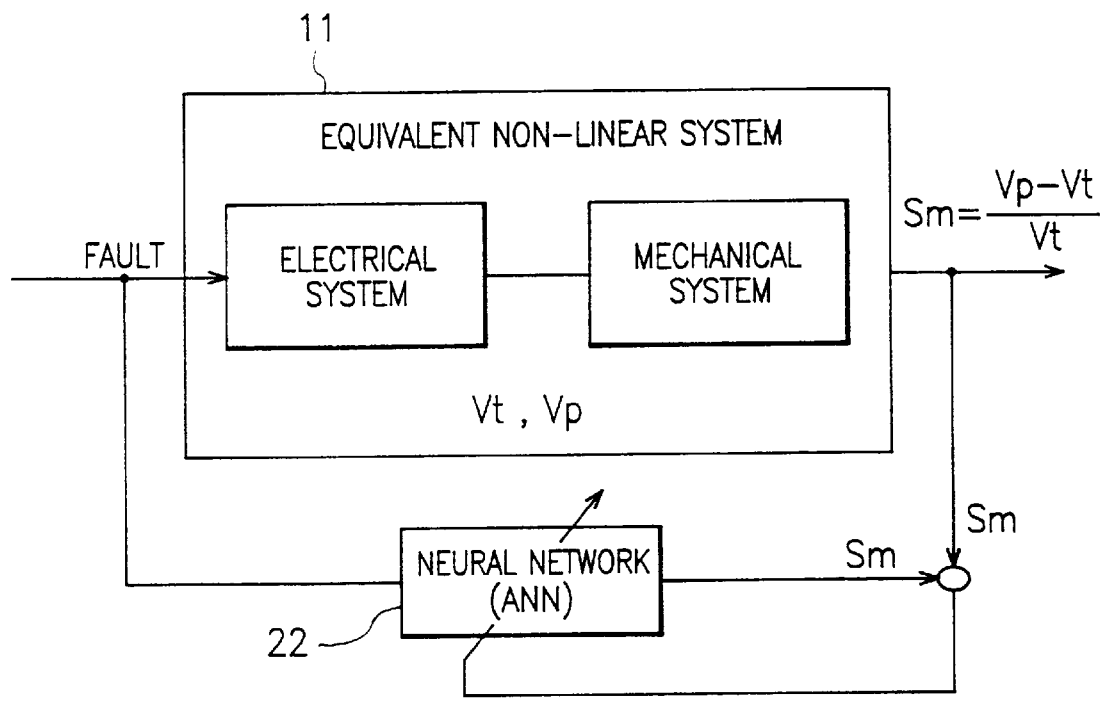
FIG. 6 is a block diagram illustrating a learning state of a system transient stability evaluation neural network of FIG. 3 according to the present invention.

First, in order to perform the automatic reclosing by using the electric power system 10, the failure information inputted into a system transient stability margin evaluation neural network 20 as shown in FIG. 6 which will be described later is received, and then the transient stability margin Sm is evaluated by a parallel processing learning.

The dead time $t_{RC}$ is varied by the reclosing relay 30 in accordance with Equation (8), which will be described later, in accordance with the transient stability margin just evaluated.

The automatic reclosing is performed by the electric power system 10 in accordance with the varied dead time.

The reclosing method according to the present invention will be compared to the conventional method as follows.

It is impossible to directly compare the reclosing method of the present invention and the conventional method due to the lack of accurate information with respect thereto, so it may be an obvious result.

$$A = \underset{i}{\text{Max}} [\alpha(\max P_{ij}) + (1 - \alpha) * (\min P_{ij})] \quad (3)$$

where, i denotes 1, 2, ..., N; and
j denotes 1, 2, ..., M.

where, A denotes a selective suggestion;

$P_0$ denotes a payoff matrix factor which a suggestion $A_1$ may obtain at a state $S_3$;

max $P_{ij}$ denotes a maximum value of payoff values;

min $P_{ij}$ denotes a minimum value of payoff values;

$\alpha$ denotes an optimistic factor with which a maximum value may be obtained among payoff values; and (1-$\alpha$) denotes an optimistic factor with which a minimum value may be obtained.

As kinds of a state occurrence with regard to the automatic reclosing for adapting the above-described rules, there are the following states:

$S_1$=a stable state (an absolute stability) after removing failure;

$S_2$=a mid-level state (a mid-stability) which needs a stability recovering means due to the system is mid-stable after removing failure; and $S_3$=a unstable state (an absolute unstable state) which the system is unstable after removing failure.

In addition, as the reclosing methods A, which are considered in the present invention, there are following methods;

$A_1$=a high speed reclosing;

$A_2$=a low speed reclosing;

$A_3$=a selective reclosing; and $A_4$=a variable dead time reclosing method based on a TSM which is suggested in the present invention.

The payoff matrix based on the above-described contents is shown in Table 1.

TABLE 1

Payoff matrix based on each reclosing method

| sytem state<br>optimistic factor<br>suggestions | | stable state<br>($S_1$)<br>$\alpha_1$ | mid stable state<br>($S_2$)<br>$\alpha_2$ | unstable state<br>($S_3$)<br>$(1 - \alpha_1 - \alpha_2)$ |
|---|---|---|---|---|
| $A_1$<br>high speed<br>reclosing | max<br>min | $d_2R_{hs}$<br>$-a(1 - R_{hs})_{hs}$ | $R_{hs}$<br>$(a(c - 1) - c) (1 - R_{hs})_{hs}$ | $b\,R_{hs}$<br>$(a(c - 1) - c) (1 - R_{hs})_{hs}$ |
| $A_2$<br>low speed<br>reclosing | max<br>min | $d_2R_{ls}$<br>0 | $d_2R_{ls}$<br>0 | $d_2R_{ls}$<br>0 |
| $A_3$<br>high/low speed<br>slection | max<br>min | $ad_2R_{ls}$<br>$c(a - 1)(1 - R_{ls})$ | $ad_2R^{ls} + (1 - a)R^{ls}$<br>$c(a - 1)(1 - R_{ls})$ | $ad_2R^{ls} + b(1 - a)R^{hs}$<br>$c(a - 1)(1 - R^{hs})$ |
| $A_4$<br>variable dead time<br>reclosing | max<br>min | $d_2R_{ls}$<br>0 | $R_{hs}$<br>$(a(c - 1) - c)(1 - R_{hs})$ | $b\,R_{hs}$<br>$(a(c - 1) - c)(1 - R_{hs})$ |

One of methods for resolving the above-described problems, there is Hurwics principle which is one of economy theory based access methods. This principle is directed to combining a pessimistic opinion and an optimistic opinion and deciding an opinion. The decider selects an index of optimism of $0 \leq \alpha \leq 1$, and then a payoff is evaluated based on Equation (3) with respect to each state of the suggestions, and then the suggestion having a biggest value is selected.

where, max factor denotes a useful payoff (+) when a reclosing succeeds, min factor denotes a unuseful payoff (-) when a reclosing is failed, namely, a damage component, and an optimistic factor ($\alpha_1$ denotes a stable optimistic factor when a failure occurred, and $\alpha_2$ denotes a semi-state optimistic factor when a failure occurred) is determined based on the system conditions, and the reclosing success ratio having other matrix components and effective factors when the reclosing succeeds, etc are as follows, where ( ) denotes a statistical value or an experiment-based value.

$R_{hs}$ denotes a high speed reclosing success ratio (=0.7~0.8);

$R_{ls}$ denotes a low speed reclosing success ratio (=0.85~0.9);

a denotes an electric generator interface cable occupying ratio among the total transmission cable (=0.2~0.3);

b denotes a high speed reclosing success effect coefficient when the system is unstable (=0.1~0.2);

$d_1$ denotes a system automatic recovering effect coefficient when a high speed reclosing is successful (=0.3~0.4);

$d_2$ denotes a system automatic recovering effect coefficient when a low speed reclosing is successful (=0.1~0.2);

c denotes a damage coefficient when a high speed reclosing is failed in a common transmission cable (=0.2~0.4);

$\alpha_1$ denotes a high failure occurrence ratio having a higher transient stability (=0.6~0.8); and $\alpha_1$ denotes a low failure occurrence ratio having a lower transient stability (=0.1~0.2).

$$A = \text{Max}_{j} \begin{array}{l} [\alpha_1 \text{max} P_{i1} + \alpha_2 \text{max} P_{i2} + (1 - \alpha_1 - \alpha_2) \text{max} P_{i3} + \\ \alpha_1 \text{min} P_{i1} + \alpha_2 \text{min} P_{i2} + (1 - \alpha_1 - \alpha_2) \text{min} P_{i3}] \end{array} \quad (4)$$

where, max $P_{i1}$ denotes a useful payoff (+) in a state S of a suggestion $A_1$, and min $P_{i1}$ denotes an unuseful payoff (-) in a state $S_1$ of a suggestion $A_1$.

Figure 4:
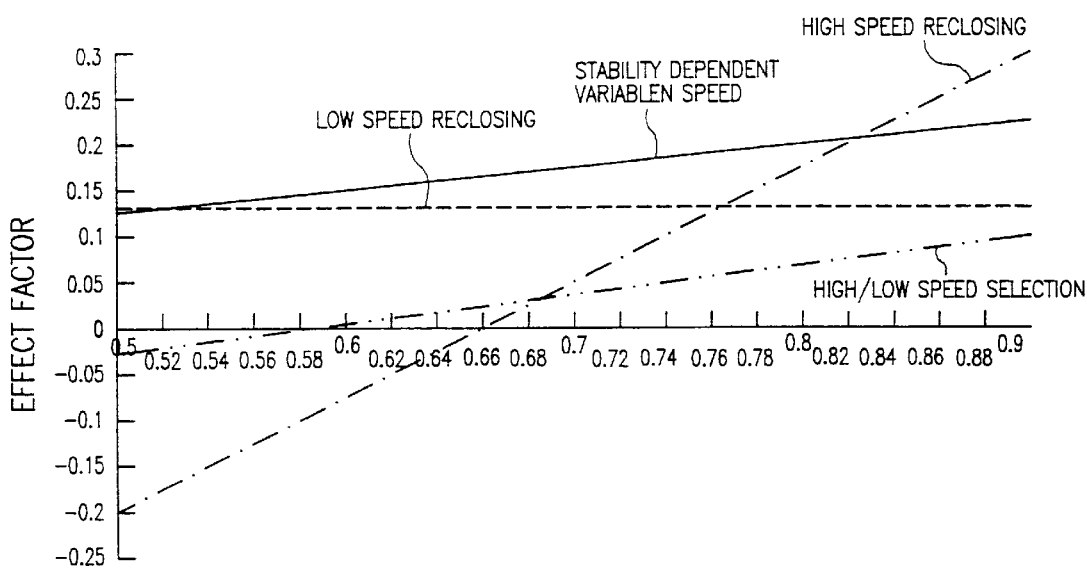
FIG. 4 is a graph illustrating the effects of each reclosing method of FIG. 3 according to the present invention.

Equation (4) is an expression of Hurwicx principle with respect to Table 1, and a comparison result in the case that $\alpha_1=0.8$, and $\alpha_2=0.125$ with respect to each suggestion is illustrated in FIG. 4.

Namely, the variable speed method according to the present invention is most effective with its automatic reclosing operation. If the high speed reclosing success ratio $R_{hs}$ is over 83%, it will be useful. However, the general success ratio with respect to the high speed reclosing so far in the industry is maximum 80%, the method is not useful.

In order to control the dead time of a corresponding transmission cable automatic reclosing relay by evaluating the transient stability when the transmission cable is failed, the high speed transient stability judgement means is necessary. Since the evaluation time of the transient stability is within a few mili seconds through a few seconds, and the automatic reclosing time is within a few hundreds mili seconds through one second, the evaluation speed is substantially high, and the evaluation must be performed in real time or on-line.

In addition, the stable/unstable classification of the stability evaluation result is must be performed in a fixed amount evaluation method which is capable of indicating the stability margin by using digits, and there should be less burden so that the factor for evaluating the stability can be more easily obtained.

As the transient stability evaluation techniques, there are a number integration method, a direct method based on Lyapunov second method, a stability factor method, a pattern recognition method, etc.

The former three methods is not available for the on-line of the automatic reclosing since it has lengthy performing time, however the pattern recognition method is available for the stability evaluation at a high speed.

Figure 5:
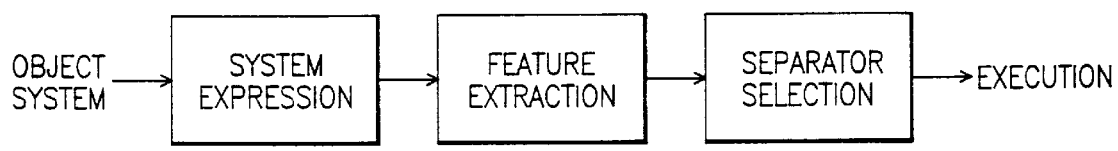
FIG. 5 is a block diagram illustrating an application process of a pattern recognition method according to the present invention.

Since this method is directed to performing a learning with respect to a predetermined feature included in the motion of the system so as to evaluate the transient stability, it is based on the knowledge obtained. In addition, the conventional pattern recognition procedure is shown in FIG. 5 and is classified in three parts.

Namely, in accordance with the stability interpretation studies based on the pattern recognition, the method are classified into a system expression based on a sample obtaining, a feature extracting, and a separator. So, the studies has been performed with respect thereto.

The stability of the electric power system is judged by information; however, the judgement is performed based on a few of representative information for rapid judgement and simplicity. In addition, the knowledge with respect to a complicated dynamic feature having the system during the failure is effectively based on the judgement means having a learning function.

In addition, a more rapid judgement is required, the pattern recognition method is better compared to a digit operation method. The parallel processing method which is directed to totally processing information is better rather than sequentially analyzing the information.

Therefore, the present invention has a learning function and a parallel processing function. In addition to that, the present invention further adapts a neural network which is known to have an excellent function for approximating a non-linear function.

In a field of the electric power system, Sobajic and Pao first introduced the neural network system for the system stability evaluation. Sine then, C. F. Ahmasd measures the stability factor by using the neural network by using the maximum value of the power spectral density (PSD) of the transient kinetic energy generated by a rotor of each generator as a specific variation, and D. B. Klapper, Y. Akimoto, Masahide Nishura et al. obtained a critical clearing time (CCT) and an energy margin by using a kinetic energy $K_E$, a positional energy $P_E$, and its varied amount or a phase angle of each generator, a phase angle acceleration just after failure, and a generator output after/before failure.

The transient stability evaluation using the conventional neural network is directed to using a source information which is obtained by extracting an actual system, a kinetic energy, a positional energy, a phase angle, PSD, etc through additional processing procedure and judging the stability through the neural network.

In addition, since the information is concurrently measured and gathered from each generator which are remotely arranged, an additional process for processing an accurate level, an information obtaining and processing procedure is necessary, and it is impossible to adapt the on-line system in the actual system. In addition, it takes to much time.

Therefore, the auto-reclosing dead time control apparatus and a method thereof for a transmission cable protection relay system according to the present invention is directed to use the transient stability evaluation technique based on a transient energy function (TEF) for adapting it with respect to the neural network.

Among the method for evaluating the stability, the TEF method is most commonly used in the industry. This method is directed to adapting an equal area method in a first limitless system for a multiple system.

Namely, when computing Area-③ as shown in FIG. 1G, the result is referred to the stability margin Sm or the energy margin Vm.

Therefore, the specific feature extraction may be obtained from an original meaning of the equal area method which is the source of the TEF method and the meaning which each variable of the transient kinetic equation of the multiple system as indicated in Equation (5) has, the following conditions among meanings and information related.

1. Failure transmission electric power of a corresponding transmission cable P

2. A cleaning time CT

3. Failure current $I_1$

4. Both ends voltage when failure occurred $E_B$

5. Nearby cable operational state $L_{i1}$

Figure 1A:
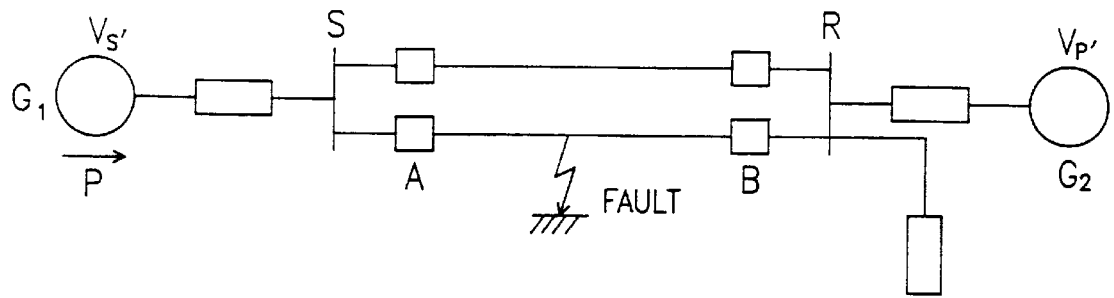
Figure 1B:
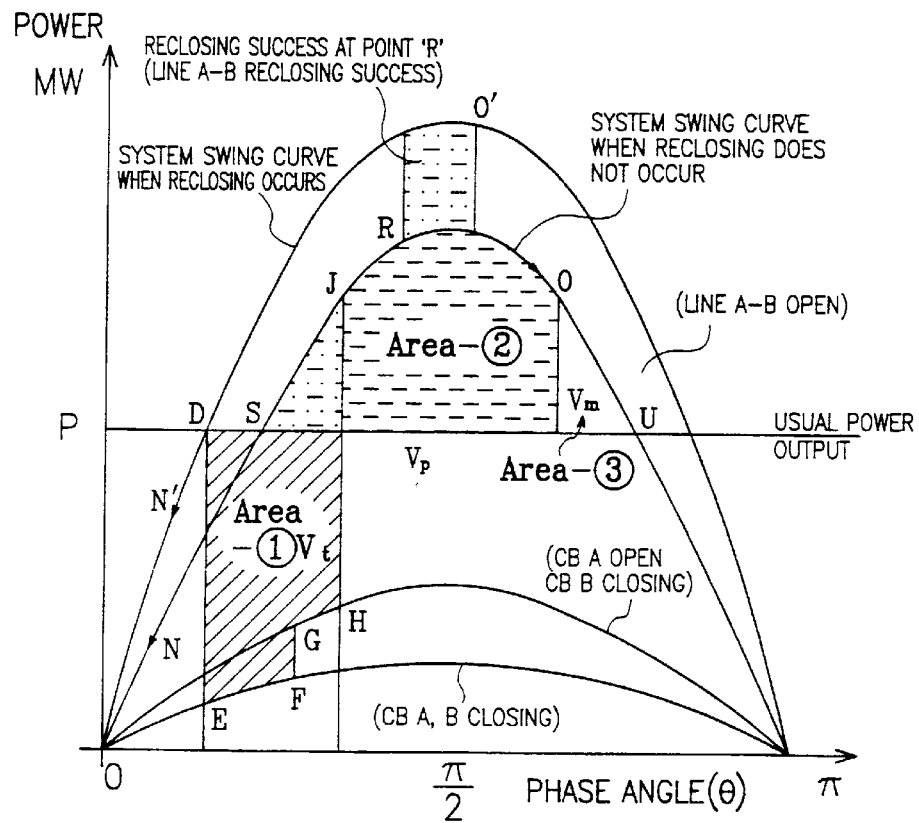
Figure 2:
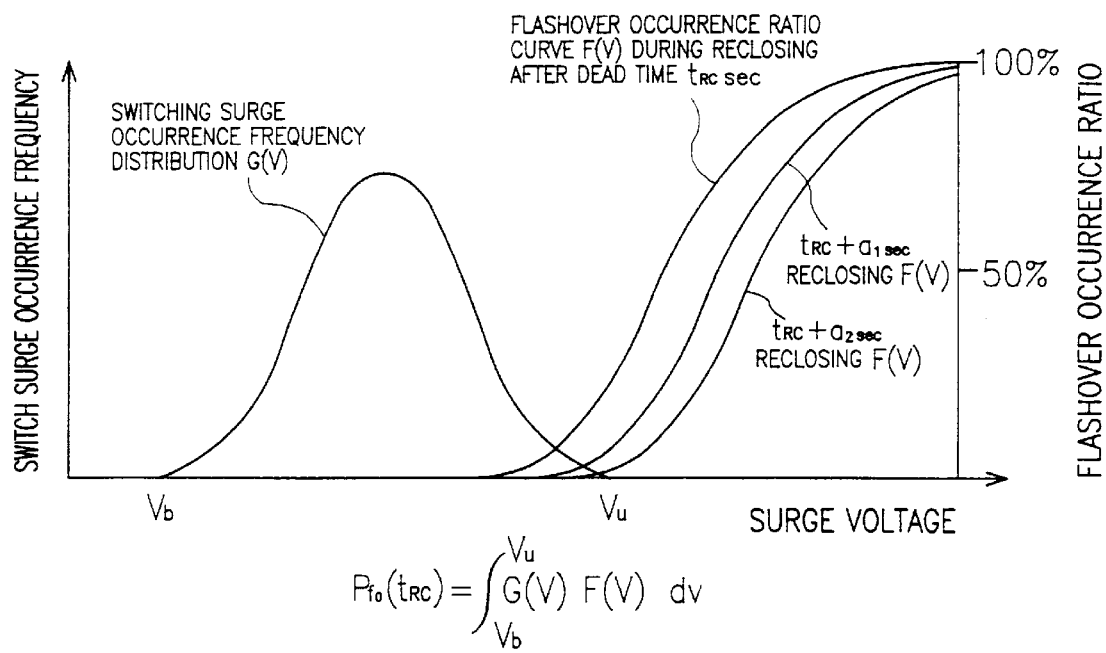
FIG. 2 is a graph illustrating the relationship between an opening/closing surge voltage occurrence distribution and a reclosing dead time in the conventional art.

As shown in FIGS. 1A and 1B, the items 1, 2, 3, and 4 are variables which form a transient energy Area-①) which occurred during the failure, and the items 1 and 5 are variables having information for presuming the positional energy Area-①+Area-② which that the system can use.

$$M_i \frac{d^2\theta_i}{dt} + D_i \frac{d\theta_i}{dt} = P_{mi} - \sum_{j=1}^{n} E_i E_j [G_{ij} \cos(\theta_i - \theta_j) + B_{ij} \sin(\theta_i = \theta_j)] \quad (5)$$

Each specific feature in Equation (5) denotes $1 \rightarrow P_{m1}$, $2 \rightarrow d/dt$, 3, 4 and $5 \rightarrow E_i$, $E_j$ and $G_{ij}$, and $B_{ij}$, respectively, as medium variables.

As variables which are not considered for Equation (5), in the left side thereof, there are an inertia moment M and a system braking coefficient D of the generator, and in the right side thereof, there are $E_i$, $E_j$ and $G_{ij}$, and $B_{ij}$. Namely, when using the above-described factors, the source voltage $E_g$ at both ends of the failure, the current $I_t$, and the operation $L_{ij}$ of a nearby transmission cable (a parallel cable, etc) which mostly affects the electric power supply between two generator. As the phase angle θ, the clearing time CT (the failure duration time) which is referred to an indirect information is used.

Therefore, the non-linear neural network is directed to map the transient stability induction Sm by using an input pattern which is obtained during a learning process and a connecting weight obtained as a result of the learning with respect to the dynamic characteristic of the system which is not introduced from a target value Sm, and the function of the learned neural network may be expressed in the following equation (6).

$$Sm = f_{ANN}(P, CT, I_Z, E_B, L_{ij}) \quad (6)$$

These specific variables selected is information which can be easily obtained from a transformer site, and it is learned by using the neural network of a multiple perceptron structure. FIG. 6 illustrates learning model of the stability evaluation neural network.

The stability margin and the reclosing dead time according to the present invention will now be explained with reference to FIG. 6.

As shown therein, the equivalent non-linear system 11 including an electrical system and a mechanical system outputs the stability margin Sm as expressed in Equation (7) which will be described later.

The stability margin Sm outputted is inputted to the equivalent non-linear system 11 by using the stability margin Sm' evaluated by the learning of an artificial neural network (ANN), and the stability margin Sm as expressed in Equation (7) is finally obtained.

In the TEF method, the stability is evaluated by using common energy type two functions.

There are a transient kinetic energy $V_t$ which occurs in the system due to the failure and is referred to Area-① as shown in FIG. 1B and a limit positional energy Vp, which is referred to Area-②+Area-③ as shown in FIG. 1B which the system can use. In addition, the energy margin is defined as Vm=Vp·Vt, and if Vm>0, it is evaluated as a stable state, and if Vm>0, it is evaluated as a unstable state.

Since the energy margin computed in the TEF method can now become a relative measurement, the stability margin Sm which is a target that the neural network is determined as a normalized value as expressed in Equation (7) so that the measurement of the transient stability margin can be relatively compared at each consideration.

$$S_m = \frac{V_m}{V_t} = \frac{V_p - V_t}{V_t} \quad (7)$$

Therefore, if $S_m$ is 1, $V_m = V_t = 0.5 V_p$, therefore, it is possible to have another consideration identical to the consideration which previously occurred. Namely, it means that if $S_m = 2$, there is a stability margin which can receive the same consideration twice more.

The matter how to consider the relationship between the size of Sm obtained by the neural network and the reclosing dead time is not based on a specific theoretical base. Namely, it may be variously adapted in accordance with the construction of an adaptable system and the position of an object cable.

In the present invention, it is deemed that the identical size failure may occur once more on the assumption of the conventional system stability maintenance. In this case, the dead time $t_{RC}$ is considered by Equation (8) based on a dividing point of Sm=3.0 so that a relationship of Sm=1.0 can be maintained.

Figure 7:
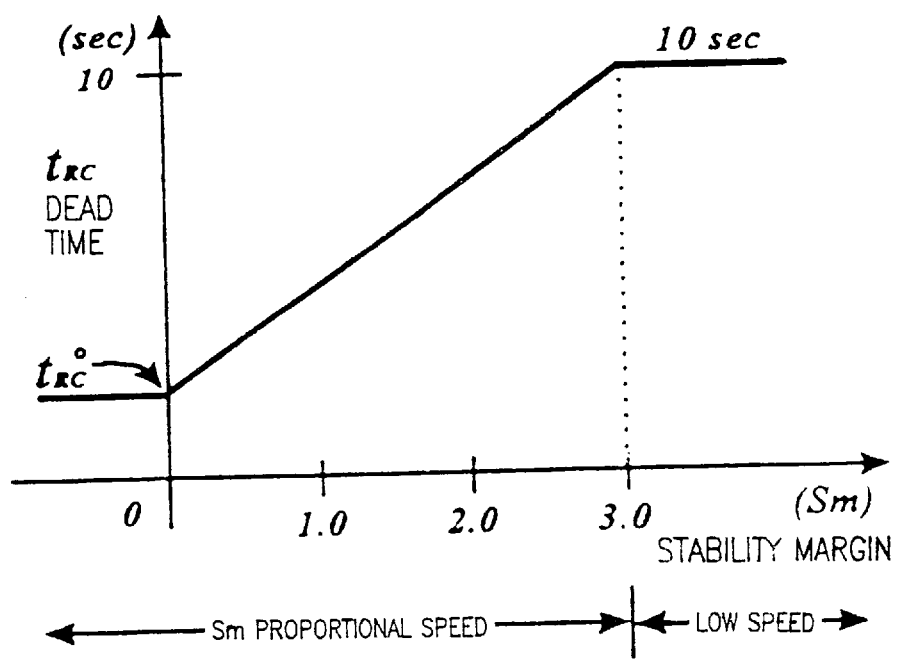
FIG. 7 is a graph illustrating the relationship between a stability margin and a dead time of FIG. 6 according to the present invention.

FIG. 7 illustrates the relationship between the stability margin Sm as expressed in Equation (8) and the dead time $t_{RC}$.

$$\text{If } 0 \leq Sm < 3, T_{RC} = \left( \frac{10 - t_{RC}}{3} \right) S_m + t_{RC} \quad (8)$$

If Sm>3, $t_{RC}$=10 seconds (in the low speed reclosing)

Figure 8:
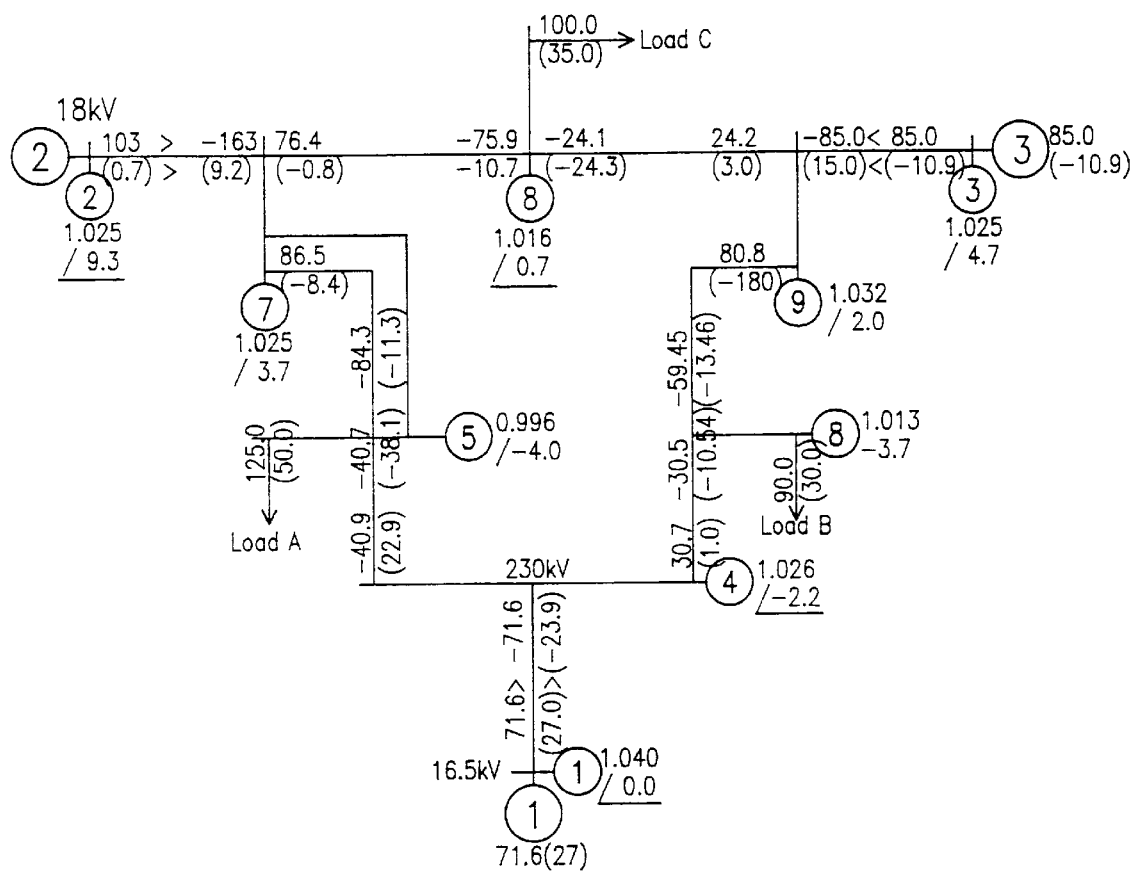
FIG. 8 is a diagram illustrating a WSCC-9 parent system according to the present invention.

In addition, as the object system for verifying the method according to the present invention, WSCC-9 source system (three system and nine sources) as shown in FIG. 8 has been widely used as a standard from in the electric power system.

The failure in the cable 7-5 between the source 7 and the source 5 is used as an object. The system operation condition and the failure condition is varied to 55, 70, 85, 90, and 100% with respect to the cable type. The failure place is considered with respect to a cable failure and the failure at the source 5 which is a most remote failure with respect to the source 7 as a reference. In addition, the kind of the failure is considered only with respect to the three-phase failure, and the resistance of 0., 3, 6, 9Ω is considered at the place of the failure.

The stability margin Sm is computed by the TEF method by performing a related computation, and a failure computation and by using the a transient function program (TEF 3.0) which was developed by EPRI and is considered as a learning pattern (totally, 213 cases), and 12 cases are included in Table 2.

The cleaning time (CT) (which is obtained by a relay operation time+a disconnection time) mostly affects the level of the stability, and the next is the cable transmission rate P. Namely, the higher the transmission rate, the more the stability margin is decreased. The more the failure place is remote from the generator, the higher the stability. Namely, $I_A$ is decreased, but $V_A$ is increased.

The learning pattern includes eight information including the stability margin which is the target.

Meanwhile, as the stability evaluation object system failure, the conditions of $Sm \leq 5.0$ and CT<25 cycles are considered. In fact, the range of the stability margin Sm which is actually adapted is +4.99 ~±1×10$^{-1-4}$~−0.79.

TABLE 2

Learning patterns for transient stability assessment (12 pts out of 213 pts)

| NO. | failed cable P(MW) | nearby cable operational state (L_o) | CT (sec) | failure current local (I_A) | failure current remote (I_S) | failure voltage local (V_A) | failure voltage remote (V_S) | stability margin (S_M) | Ref. failure position | Ref. resistance (Ω) | level |
|---|---|---|---|---|---|---|---|---|---|---|---|
| 1  | 45.9 | 1 | 6  | 2455.4 | 322.5  | 0    | 56   | 4.99558  | 7 | 0 | |
| 6  | 69.6 | 0 | 12 | 540.8  | 1432.3 | 93.9 | 0    | 3.2964   | 5 | 6 | |
| 10 | 77.9 | 0 | 6  | 2140   | 395    | 15.2 | 77   | 2.3899   | 7 | 6 | |
| 15 | 45.9 | 1 | 18 | 430    | 1795   | 75.2 | 6.7  | 1.7303   | 5 | 3 | High |
| 18 | 43.3 | 1 | 12 | 2430   | 314    | 8.2  | 58   | 1.4475   | 7 | 3 | |
| 22 | 65.4 | 0 | 8  | 2157.8 | 429.4  | 0    | 74.6 | 1.06927  | 7 | 0 | |
| 24 | 45.9 | 1 | 10 | 2455.4 | 322.5  | 0    | 56   | 0.8976   | 7 | 0 | |
| 27 | 73.7 | 0 | 9  | 2155   | 412    | 7.7  | 75.5 | 0.3622   | 7 | 3 | |
| 32 | 48.5 | 1 | 11 | 2459.1 | 321.9  | 0    | 55.9 | -0.0003  | 7 | 0 | |
| 38 | 48.5 | 1 | 15 | 2439   | 311.2  | 8.2  | 57.9 | -0.3711  | 7 | 3 | Low |
| 39 | 65.4 | 0 | 15 | 2147   | 417    | 7.7  | 75.9 | -0.3891  | 7 | 3 | |
| 40 | 69.6 | 0 | 15 | 2150   | 415    | 7.7  | 75.7 | -0.6171  | 7 | 3 | |

As seen in Table 2, there is difficulties in learning a pattern which is near a very low stable/unstable limit of the learning target value (Sm=-0.0003) as thirty second pattern together with a higher pattern because the object function of an error reverse wave learning algorithm minimizes to the size of the absolute error with respect to the target value. The error with respect to the learning pattern having a lower stability margin may not reduced even by increasing the number of the learning.

The above-described phenomenon is called a downward tendency. Namely, high level student may become low level student when the class is proceeded by focusing to the low level student. In order to overcome the above-described problems, there is a method of proceeding the class by dividing the student into two classes of a senior class and a junior class through a level test. Of course, in this case, some problems such as the numbers of teachers and classrooms may occur. However, this method has better effect for achieving a desired learning target based on capability of each student.

Figure 9:
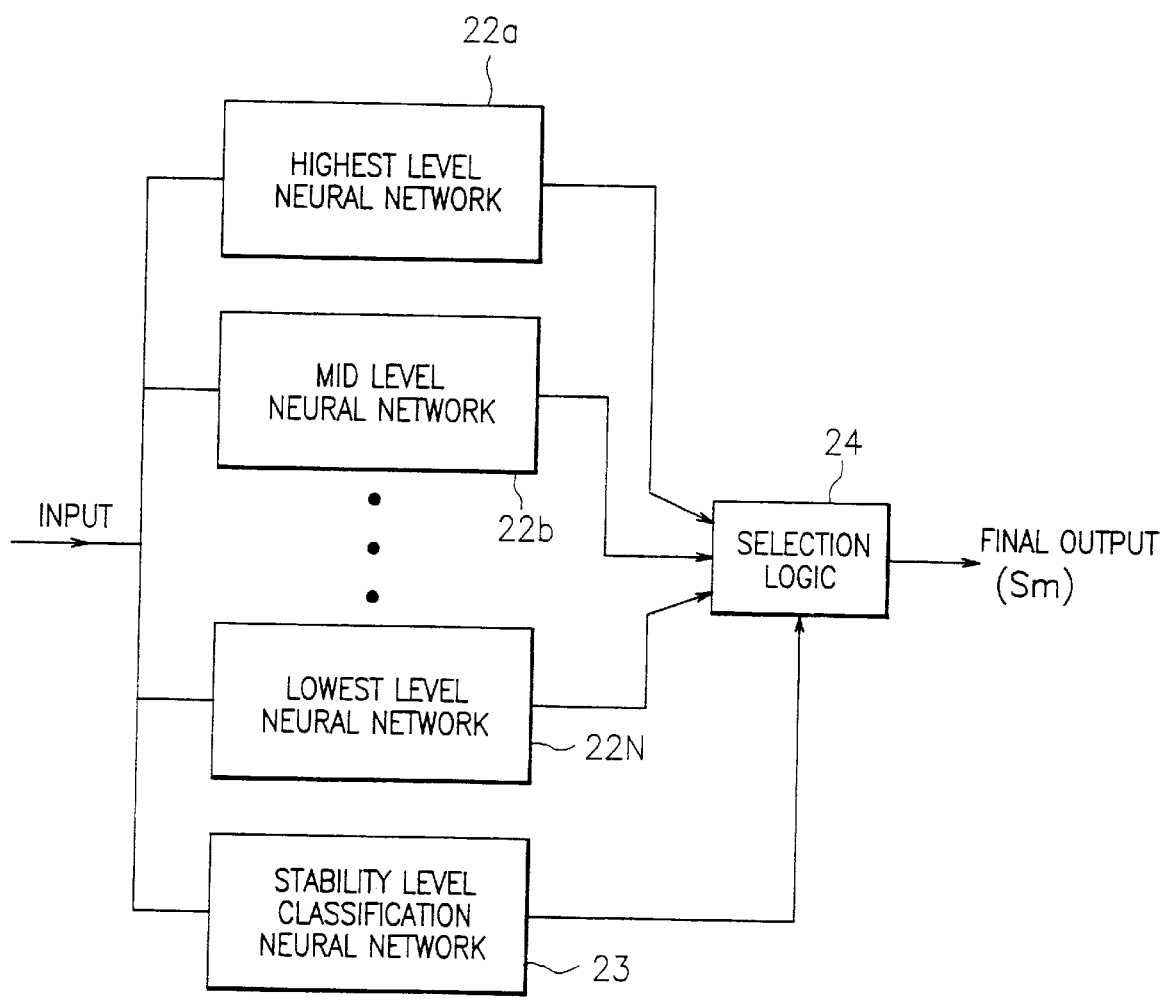
FIG. 9 is a block diagram illustrating a level separation parallel coupling type of a neural network of FIG. 6 according to the present invention.

Based on the above-described consumption, a plurality of neural networks are connected to one another as shown in FIG. 9 so as to divide the range of the stability margin Sm. The construction thereof is as follows:

The neural network includes a highest level neural network (ANN-1) (High) 22a, mid-level neural network (ANN-2) 22b, a lowest level neural network (ANN-3) (Low) 22N, and a stability level classification neural network 23.

These neural networks are used for classifying the stability margin by size and learning the same, and in fact, the entire learning range is divided into two levels.

Namely, each level dividing exclusive neural network is learned by a corresponding learning pattern, and each target value is presumed by concurrently receiving the input during the operation. In addition, the output from the neural network of the level classified by using the neural network ANN-C which is directed to dividing the stability margin value is selected by the selection logic unit 24. Namely, the above-described method is called a level classification evaluation method.

High level: $1.0, Sm \leq 5.0 \rightarrow$ high-level ANN

Low level: $-1.0 < Sm \leq 1.5 \rightarrow$ Low-level ANN

Two neural networks 22a and 22N have triple perception structures each having double hidden floors. The number of units of each floor is 7-70-12-1, 7-74-13-1.

In addition, the number of learning pattern is 109 and 131, respectively, and the transfer function of each floor adapts a log-sigmoid, and the target value is scaled from 1.5~-1.0 to 1.0~0 by the lowest level neural network 22N.

In addition, since the stability level classification neural network 23 does not need a higher accuracy, a double perceptron structure having a hidden floor of 168 units is used, an the target value of each input pattern is 1.0 in the case of high, and 0.0 in the case of low. Namely, the transfer function of the output floor is made a step function.

In addition, with respect to the number of the learning patterns, 213 patterns used in two neural networks 22a and 22N are learned.

In order to check the performance of the learned neural network, an experiment was conducted by using a computer. A representative result thereof is shown in Table 3 and 4.

TABLE 3

Transient stability evaluation experiment input pattern table (15 cases out of 56 cases)

| NO. | failed cable P(MW) | nearby cable operational state (ON/OFF) | CT (sec) | failure current local (I_A) | failure current remote (I_S) | failure voltage local (V_A) | failure voltage remote (V_S) | stability margin (V_M) | Het failure position | Het resistance (Ω) |
|---|---|---|---|---|---|---|---|---|---|---|
| 1  | 77.9 | 0 | 6  | 543    | 1342  | 95.3 | 17   | 9.2104  | 5 | 9 |
| 5  | 65.4 | 0 | 12 | 1351   | 537   | 94.8 | 17   | 7.7272  | 5 | 9 |
| 10 | 48.5 | 1 | 5  | 2459.1 | 321.9 | 0    | 55.9 | 5.97412 | 7 | 0 |

TABLE 3-continued

Transient stability evaluation experiment input pattern table (15 cases out of 56 cases)

| NO. | failed cable P(MW) | nearby cable operational state (ON/OFF) | CT (sec) | failure current local ($I_A$) | failure current remote ($I_S$) | failure voltage local ($V_A$) | failure voltage remote ($V_S$) | stability margin ($V_M$) | failure position | Het resistance ($\Omega$) |
|---|---|---|---|---|---|---|---|---|---|---|
| 14 | 73.7 | 0 | 6  | 2138   | 397    | 15.2 | 77.2 | 3.8245  | 7 | 6 |
| 19 | 40.7 | 1 | 12 | 2428   | 315    | 8.2  | 58.1 | 2.3189  | 7 | 3 |
| 28 | 69.6 | 0 | 18 | 540.8  | 1432.3 | 93.9 | 0    | 1.1829  | 5 | 0 |
| 34 | 77.9 | 0 | 6  | 2168.6 | 425    | 0    | 73.8 | 0.55899 | 7 | 0 |
| 38 | 40.7 | 1 | 30 | 425    | 1763   | 75.8 | 13.1 | 0.0002  | 5 | 6 |
| 39 | 43.3 | 1 | 15 | 2430   | 314    | 8.2  | 58   | −0.001  | 7 | 3 |
| 40 | 45.9 | 1 | 12 | 2455.4 | 322.5  | 0    | 56   | −0.0015 | 7 | 0 |
| 41 | 48.5 | 1 | 20 | 431.5  | 1829.1 | 74.9 | 0    | −0.002  | 5 | 0 |
| 42 | 43.3 | 1 | 13 | 2451   | 323    | 0    | 56.1 | −0.0033 | 7 | 0 |
| 50 | 65.4 | 0 | 30 | 539.5  | 1431.5 | 93.7 | 0    | −0.2692 | 5 | 0 |
| 53 | 45.9 | 1 | 21 | 2370   | 290    | 23.9 | 63.7 | −0.4467 | 7 | 9 |
| 56 | 69.6 | 0 | 18 | 2150   | 415    | 7.7  | 75.7 | −0.7277 | 7 | 3 |

TABLE 4

Test results of the stability assessments and reclosing dead time

| NO. | level facter A | assess- level B | stability High-ANN C | stability Low-ANN D | final stability E($\approx$C/D $\approx$ B) | traget stability F | error (E − F)/F | absolute error E − F | dead time value G | dead time target H | dead time error (G − H)/H |
|---|---|---|---|---|---|---|---|---|---|---|---|
| 1  | 0.99992  | 1 | 8.60892 | 1.499997 | 8.60892  | 9.2104  | −6.53044 | −0.60148 | 10       | 10       | 0        |
| 5  | 1        | 1 | 7.01122 | 1.5      | 7.01122  | 7.7272  | −9.26571 | −0.71598 | 10       | 10       | 0        |
| 10 | 0.996757 | 1 | 5.91853 | 1.497954 | 5.91853  | 5.97412 | −0.93051 | −0.05559 | 10       | 10       | 0        |
| 14 | 0.970402 | 1 | 3.74146 | 1.497396 | 3.74146  | 3.8245  | −2.17126 | −0.08304 | 10       | 10       | 0        |
| 19 | 0.919222 | 1 | 2.33064 | 1.489581 | 2.33064  | 2.3189  | 0.506275 | 0.01174  | 7.832612 | 7.794598 | 0.487698 |
| 22 | 0.865347 | 1 | 2.12113 | 1.462269 | 2.12113  | 2.11169 | 0.447035 | 0.00944  | 7.154219 | 7.123652 | 0.429088 |
| 25 | 0.542491 | 1 | 1.44743 | 1.328148 | 1.44743  | 1.4475  | −0.00484 | −7E−05   | 4.972778 | 4.973005 | −0.00456 |
| 28 | 0.37605  | 0 | 1.21225 | 1.155933 | 1.155933 | 1.1829  | −2.27974 | −0.02697 | 4.211266 | 4.11623  | 2.308795 |
| 31 | 0.397615 | 0 | 0.93309 | 0.8265   | 0.8265   | 0.8764  | −5.69375 | −0.0499  | 2.962207 | 3.123783 | −5.17245 |
| 34 | 0.21665  | 0 | 0.73951 | 0.551133 | 0.551133 | 0.55899 | −1.40557 | −0.00786 | 2.070569 | 2.09601  | −1.21378 |
| 38 | 0.214935 | 0 | 0.86564 | −0.05274 | −0.05274 | 0.0002  | −26470   | −0.06294 | 0.286    | 0.286648 | −0.22592 |
| 39 | 0.00919  | 0 | 0.45923 | 0.009771 | 0.009771 | −0.001  | −1077.1  | 0.010771 | 0.317638 | 0.286    | 11.06241 |
| 40 | 0.003667 | 0 | 0.46544 | −0.0136  | −0.0136  | −0.0015 | 806.6667 | −0.0121  | 0.285    | 0.286    | 0        |
| 41 | 0.004744 | 0 | 0.52051 | 0.009378 | 0.009378 | −0.002  | −568.9   | 0.011378 | 0.316365 | 0.286    | 10.61747 |
| 42 | 0.004042 | 0 | 0.46931 | −0.01861 | −0.01861 | −0.0033 | 463.9394 | −0.01531 | 0.286    | 0.286    | 0        |
| 50 | 0.009873 | 0 | 0.30654 | −0.14736 | −0.14736 | −0.2692 | −45.26   | 0.12184  | 0.286    | 0.286    | 0        |
| 53 | 0.018992 | 0 | 0.28498 | −0.3206  | −0.3206  | −0.4467 | −28.2292 | 0.1261   | 0.286    | 0.286    | 0        |
| 56 | 0.000101 | 0 | 0.0515  | −0.82418 | −0.82418 | −0.7277 | 13.25821 | −0.09648 | 0.286    | 0.286    | 0        |

As the experiment patterns, 56 patterns which were not used as the learning pattern among the identical system failures (WSCC9BUS, 7-5 line) in which the stability margin is ranged between +9.5 and −0.7).

In table 4, an output A of the level classification ANN-C, a step function output B, a stability assessment result of a high-ANN C and a low-ANN d, and a comprehensive assessment result E obtained from the ANN-C output B are seed. In addition, an actual stability margin Sm F computed by the TEF is included therein.

The transient stability evaluation error (E-F)/F is within ±14% in the range of Sm≦0.1, however, there is a big % error even when the absolute error (E-F) is below ±0.1.

In addition, in the case of test pattern numbers 38, 39, and 41, the stable and unstable states may be changed with each other.

However, these absolute errors actually has an error difference of ±0.05.

Figure 10:
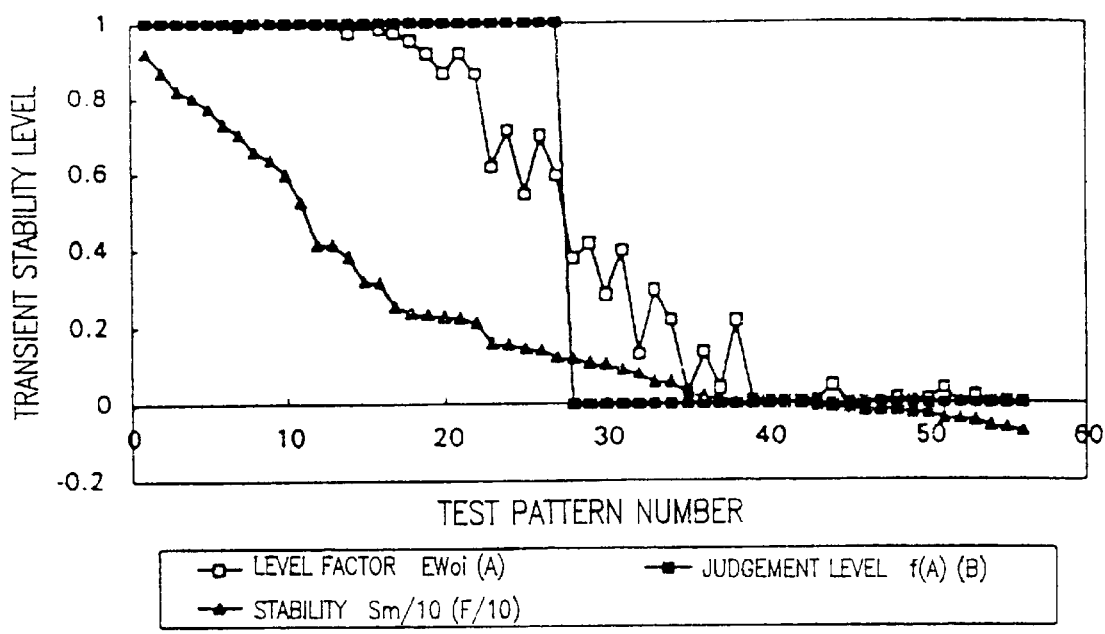
FIG. 10 is a graph illustrating the relationship between the output of a level separation parallel coupling type neural network and a stability margin of FIG. 9 according to the present invention.
Figure 11:
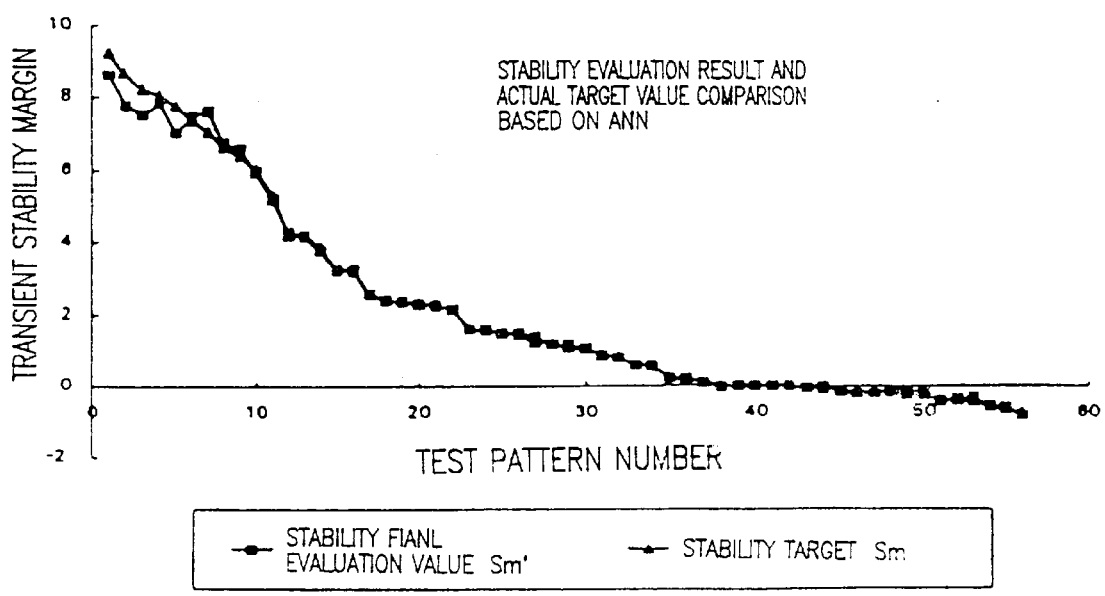
FIG. 11 is a graph illustrating a comparison result between a stability evaluation final result and an actual value of a neural network according to the present invention.

FIG. 10 is a graph illustrating the relationship between the output of a level separation parallel coupling type neural network and a stability margin of FIG. 9 according to the present invention, and FIG. 11 is a graph illustrating a comparison result between a stability evaluation final result and an actual value of a neural network according to the present invention.

As shown therein, the stability of margin is well continent to the actual value in the range of 5.0≦Sm<7.10 which is greater than the learning range (Sm≦0.5), and is near to the actual value in the range above the above-described range. In addition, in other ranges, the stability margin has an inference performance which is well adaptable to the actual value.

The reclosing dead time $T_{RC}$ based on the evaluated stability margin Sm and the actual stability is computed based on G and H as shown in Table (4) in accordance with Equation (8).

The error difference therebetween is ±11%, and the error difference problems may be overcome by increasing the number of neural network learning, the number of hidden floors, and the number of units.

Figure 12:
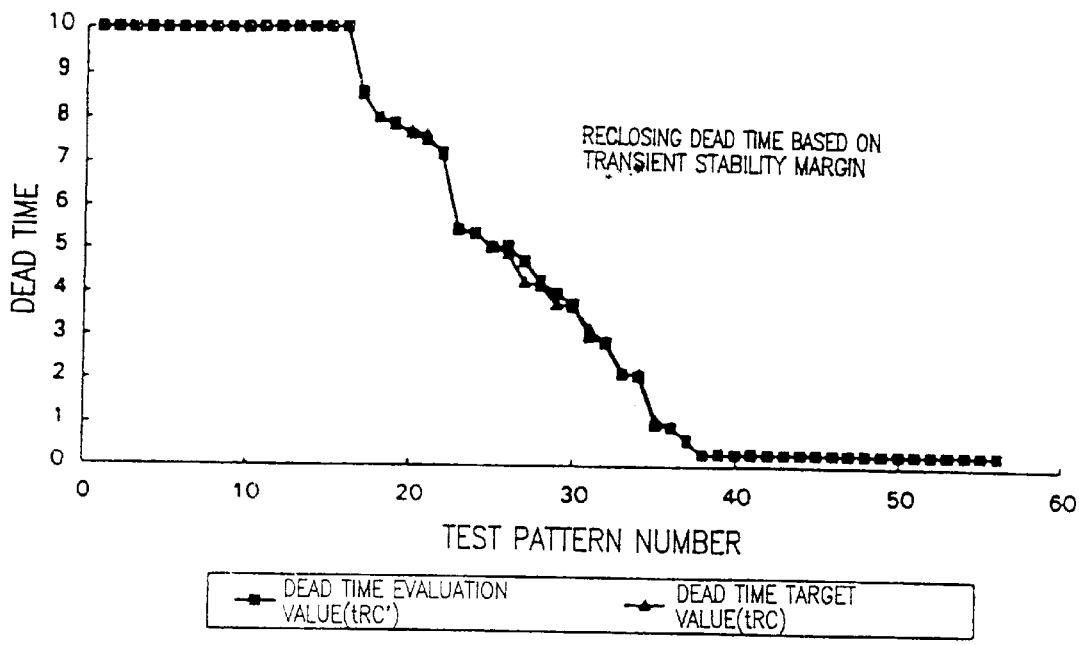
FIG. 12 is a graph illustrating a reclosing dead time of a WSCC-9 Bus 7-5 cable according to the present invention.
Figure 13:
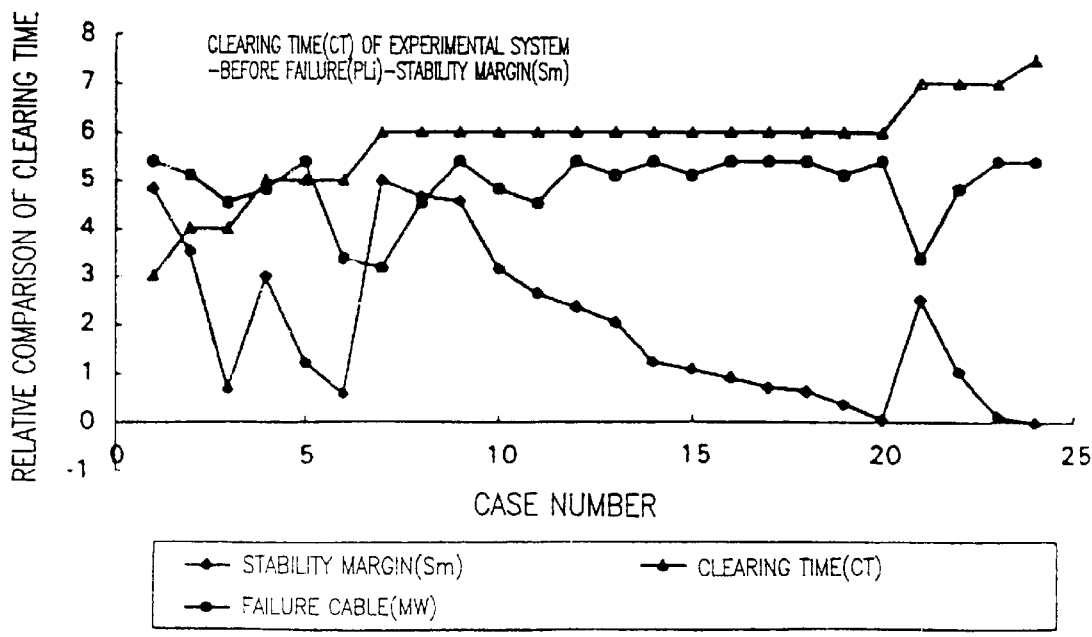
FIG. 13 is a graph illustrating the relationship between a failure removing time CT, a failure symptom, a stability margin based on an experiment according to the present invention.

In addition, FIG. 12 is a graph illustrating a reclosing dead time of a WSCC-9 Bus 7-5 cable according to the present invention, and FIG. 13 is a graph illustrating the relationship between a failure removing time CT, a failure symptom, a stability margin based on an experiment according to the present invention.

As shown therein, it is possible to implement the low speed reclosing.

As described above, the auto-reclosing dead time control apparatus and a method thereof for a transmission cable protection relay system according to the present invention is directed to providing an on-line stability evaluation method which is capable of controlling the dead time of the transmission cable automatic reclosing relay in accordance with the stability margin.

This evaluation method is directed to using a few actual information, and since the stability and the dynamic information of a related electric power related statistic result is learned with respect to the neural network, it is possible to evaluate the stability at the time of actual failure based on a system characteristic.

As the information which is necessary for the stability evaluation, there are a transmission electric power before failure, a clearing time (CT), a failure kind, a failure current level, and a nearby cable operational state, etc.

Namely, it is possible to presume the entire system phenomenon by using information by condensing the electric power system properly.

The stability evaluation neural network is a multiple perceptron, and the learning algorithm is performed by using an error reverse wave learning algorithm, and a plurality of neural networks is used in order to decrease the learning error of the failure patterns in which the stability margin is low, and a method of classifying the level of learning into high and low is considered.

In fact, the WSCC-9 Bus system is considered as the target, and as a result of the learning and test, it is possible to obtain a desired accuracy which can be used.

The stability margin for obtaining a desired learning pattern is obtained by using the TEF method based on the energy function which can be evaluated in a flat amount method.

In addition, the on-line stability evaluation method according to the present invention is directed to using a major transmission automatic reclosing dead time control, and when controlling a flexible AC transmission system which has been widely studied, and it is possible to additionally provide a function which is capable of controlling the stability margin.

If the automatic reclosing dead time is determined by the method according to the present invention, since the failure removal is performed within six cycles in accordance with the protection relay and connector operation time, it is possible to obtain a low speed reclosing having $T_{aC}$ of 3.5 seconds under the conditions of $Sm \leq 1.0$ at a usual operation below 75% as shown in FIG. 13, and in addition, it is possible to expect a higher success ratio compared to the high speed reclosing of 0.286 second, and even through it is failed, it is possible to reduce the impact applied to the electrical components.

Although the preferred embodiments of the present invention have been disclosed for illustrative purposes, those skilled in the art will appreciated that various modifications, additions and substitutions are possible, without departing from the scope and spirit of the invention as recited in the accompanying claims.

What is claimed is:

1. An auto-reclosing control apparatus in a protective relaying system for a transmission line circuit breaker in a power system, comprising:
   an electronic device to evaluate a state of the power system by on-line assessment of a transient stability margin of the power system using a set of information measured from a local area around a faulted transmission line; and
   an auto-reclosing means for a circuit breaker closing automatically with a variable dead time interval after the circuit breaker opens the faulted transmission line in accordance with the stability margin evaluated by the electronic device for transient stability margin evaluation.

2. The apparatus of claim 1, wherein said margin electronic device is directed to classifying a degree of transient stability by self-normalized energy margin using a plurality of artificial networks which is trained by information extracted from off-line simulations of transient stability when a fault occurs on the faulted transmission line.

3. The apparatus of claim 2, wherein said plurality of neural networks is comprised of two or more levels of artificial neural networks which are dedicated for a certain level of stability margin independently with a smaller error than the other level ones, and a stability level classification artificial neural network.

4. An auto-reclosing dead time control method for transmission line protection system, comprising the steps of:
   a first step for evaluating a transient stability margin of an electrical power system by on-line method applying a parallel processing capability and a nonlinear approximation function of an artificial neural network using a set of information inputted from the power system to evaluate the transient stability margin when a fault occurs;
   a second step for varying the dead time of auto-reclosing in accordance with the transient stability margin evaluated by an electric device; and
   a third step for performing an automatic reclosing in accordance with the variable dead time determined in the second step.

5. The method of claim 4, wherein said dead time is directed to varying by a degree of the transient stability margin so that a rate of successful auto-reclosing is increased and damage into electrical equipments is decreased.

6. The method of claim 4, wherein said transient stability margin is directed to evaluating and selecting an output based on a learning of a plurality of neural networks classified into a predetermined level based on an input.

7. The method of claim 6, wherein said transient stability margin is directed to evaluating a power flow before a fault of transmission line, fault type, fault clearing time, fault current and voltage at both-ends, and on/off status of the electrically closest transmission line with the faulted transmission line based on the learning of the neural network.

8. The method of claim 6, wherein said transient stability margin is directed to calculate a power valuating degree based on a learning by classifying the neural networks into several levels, and a stability level by a degree of the transient stability margin.

* * * * *